(12) United States Patent  (10) Patent No.: US 9,293,843 B2
Lu  (45) Date of Patent: Mar. 22, 2016

(54) NON-POLARIZED GEOPHYSICAL ELECTRODE

(71) Applicant: Yi Lu, Toronto (CA)

(72) Inventor: Yi Lu, Toronto (CA)

( * ) Notice: Subject to any disclaimer, the term of this patent is extended or adjusted under 35 U.S.C. 154(b) by 134 days.

(21) Appl. No.: 13/999,781

(22) Filed: Mar. 21, 2014

(65) Prior Publication Data

US 2015/0270627 A1  Sep. 24, 2015

(51) Int. Cl.
*G01V 3/00* (2006.01)
*H01R 4/66* (2006.01)
*G01V 3/02* (2006.01)
*G01V 3/08* (2006.01)

(52) U.S. Cl.
CPC .. *H01R 4/66* (2013.01); *G01V 3/02* (2013.01); *G01V 2003/085* (2013.01)

(58) Field of Classification Search
CPC .............. H01R 4/66; G01N 27/30–27/32; G01N 27/327; G01N 27/333; G01N 27/403; G01V 3/02; G01V 2003/085
See application file for complete search history.

(56) References Cited

U.S. PATENT DOCUMENTS

| 2,595,042 | A | * | 4/1952 | Wyllie | G01V 3/20 204/408 |
| 3,782,179 | A | * | 1/1974 | Richards | G01N 27/121 73/73 |
| 3,863,200 | A | * | 1/1975 | Miller | G01V 1/181 330/109 |
| 2008/0228401 | A1 | * | 9/2008 | Zhou | G01V 3/12 702/7 |
| 2010/0271029 | A1 | * | 10/2010 | Fainberg | G01V 3/12 324/334 |
| 2011/0210282 | A1 | * | 9/2011 | Foley | B82Y 25/00 252/62.51 R |
| 2012/0038362 | A1 | * | 2/2012 | Kjerstad | G01V 3/12 324/337 |

FOREIGN PATENT DOCUMENTS

| CN | 103063894 A | * | 4/2013 |
| JP | 2001074850 A | * | 3/2001 |
| JP | 2001076783 A | * | 3/2001 |

* cited by examiner

*Primary Examiner* — Luke Ratcliffe
*Assistant Examiner* — Hovhannes Baghdasaryan
(74) *Attorney, Agent, or Firm* — David W. Wong

(57) ABSTRACT

The non-polarized geophysical electrode has an electrically conductive metal disk mounted at its bottom opening. A mixture of an adhesive such as epoxy, inorganic binder, or RTV silicone, and fine particles in micron or nano size of graphene, nickel, nanotube, or graphite is applied on the outer bottom surface of the conductive metal disk. A lead wire of the electrode is connected to the inner surface of the conductive metal disk and extends outward through a liquid-tight strain relief mounted at a cap provided at the top of the housing of the electrode.

8 Claims, 3 Drawing Sheets

NON-POLARIZED GEOPHYSICAL ELECTRODE

BACKGROUND OF THE INVENTION

1. Field of the invention

This invention relates to a geophysical electrode and more particularly to a non-polarized geophysical electrode applicable for conducting measurements of geoelectric field signals in the ground to determine underground composition in geophysical prospecting.

2. Background Art

Geophysical electrodes have been used for measuring telluric current signals, earthquake signals, and electrical potential from the earth ground especially in various geophysical measurement methods such as MT (magnetotelluric), AMT (audio-magnetotelluric), IP (induced polarization), and resistivity measurement. In geophysical prospecting, a plurality of electrodes are employed for measuring and mapping the ground potential signals in a geoelectric field at a selected ground site. A plurality of electrodes are inserted into the ground at a plurality of selected locations of the site. The correlation of the ground potential in geoelectric field signal measurements obtained at those locations enables a determination of the mineral deposit at the site. Presently, non-polarized electrodes are employed for carrying out the measurements. Such electrode generally consists of a tubular enclosure having a porous bottom cover plate or alternatively having a porous tubular container mounted at its lower end. Commonly, porous ceramic or gypsum is used for making the cover plate or the lower tubular container. The electrode is filled with an electrolyte consisting of a chemical reaction compound such as copper sulfate ($CuSO_4$) or lead chloride ($PbCl_2$) solution. A copper (Cu) or lead (Pb) rod located inside the electrode extends from a lead wire terminal provided at the upper cover of the enclosure to the bottom of the chemical electrolyte within the electrode.

In application, it is necessary to dampen the ground of a prospecting site with an electrolytic compound solution such as a solution of sodium chloride, then a plurality of the measuring electrodes are inserted into the wetted ground at various selected locations of the site to measure the geoelectric field signals at those locations. With the insertion of the porous lower portion of the electrode into the ground, the chemical reaction compound of electrolyte in the electrode would inherently leach from the electrodes into the ground through the porous lower portion thus causing undesirable environmental pollution. The leaching of the electrolytic compound into the ground would also deplete the amount of the electrolytic compound within the electrode with each use of the electrode and therefore invariably reducing useful life of the electrode. Additionally, the amount of electrolyte can moreover be depleted by evaporation through the porous portion of the electrode housing. Furthermore, the effectiveness of the electrode is greatly reduced in cold weather condition when air temperature is lower than −10° C. causing freezing of its fluidic electrolyte.

In order to prevent the evaporation of the electrolyte from the porous lower plate or lower tubular portion of the electrode housing, it is a necessary to cover the electrode with a wet covering pad or wrapping material during storage, which is messy to carry out.

Moreover, the effective contact surface between the electrode and the ground is also restricted by the small size and diameter of the tubular porous portion of the electrode housing.

Still furthermore, such electrode filled with reaction chemical electrolytic solution is difficult to handle and transport without causing leakage of the chemical compound in such circumstances, and it is also hazardous to the health of the workers fabricating the electrode due to the inherent exposure of the workers to the toxic copper sulfate or the lead in the lead chloride of the chemical reaction compound in the electrolyte.

SUMMARY OF THE INVENTION

It is a principal object of the present invention to provide a non-polarized electrode which does not contain any chemical reaction compound.

It is another object of the present invention to provide a non-polarized electrode which is easy to fabricate and use.

It is still another object of the present invention to provide a non-polarized electrode which does not cause any pollution to the ground and environment in its application.

BRIEF DESCRIPTION OF THE DRAWINGS

Other objects and advantages of the present invention will become apparent from the following detailed description of the preferred embodiments thereof in connection with the accompanying drawings in which.

DETAILED DESCRIPTION OF THE PREFERRED EMBODIMENTS

Figure 1:
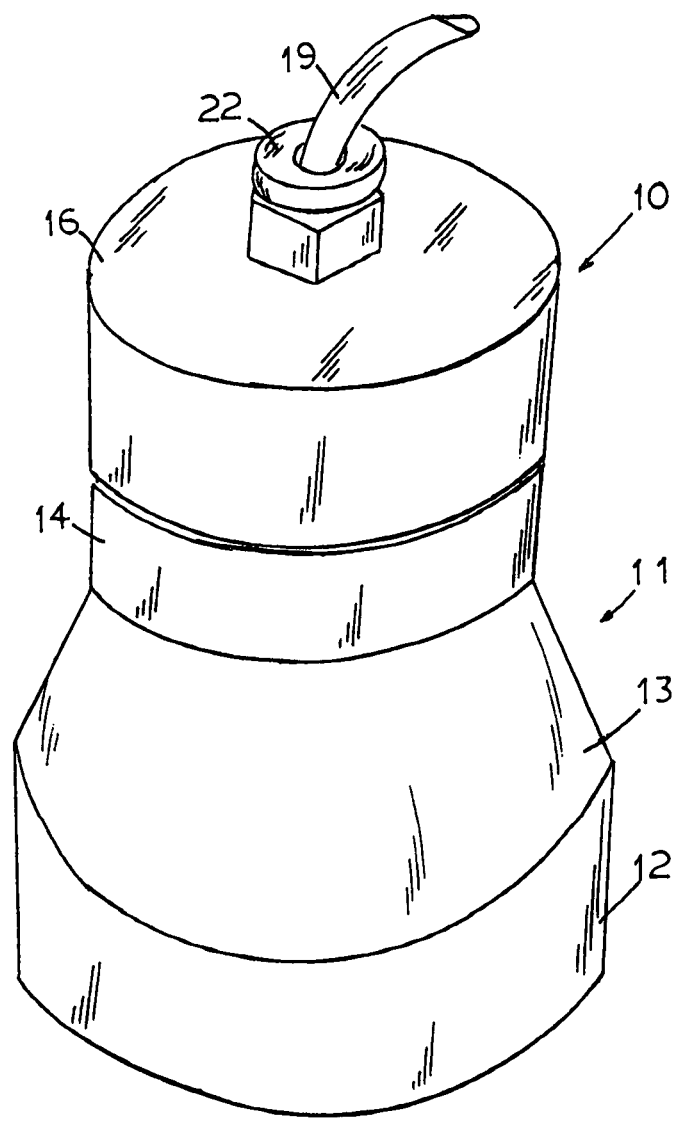
FIG. 1 is the perspective top and side and elevation view of the electrode according to the present invention.
Figure 2:
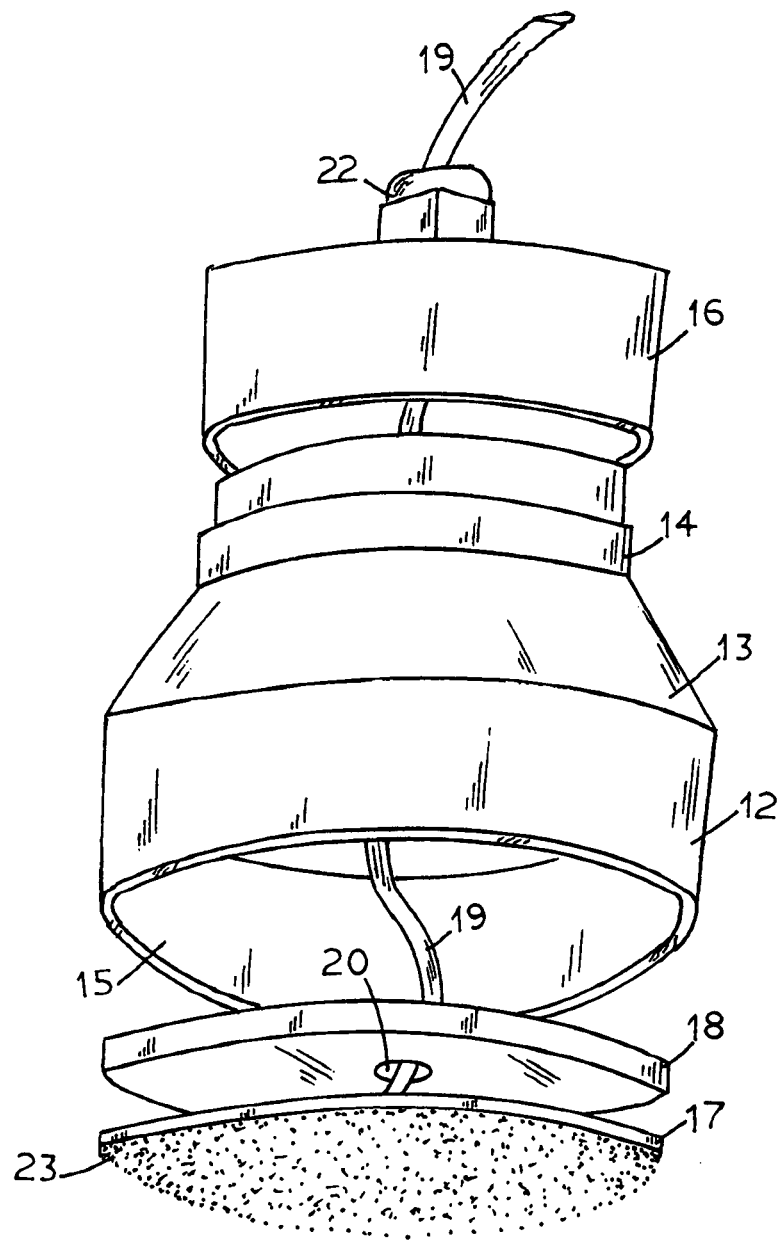
FIG. 2 is an exploded perspective side and bottom elevation view thereof showing its various components.
Figure 3:
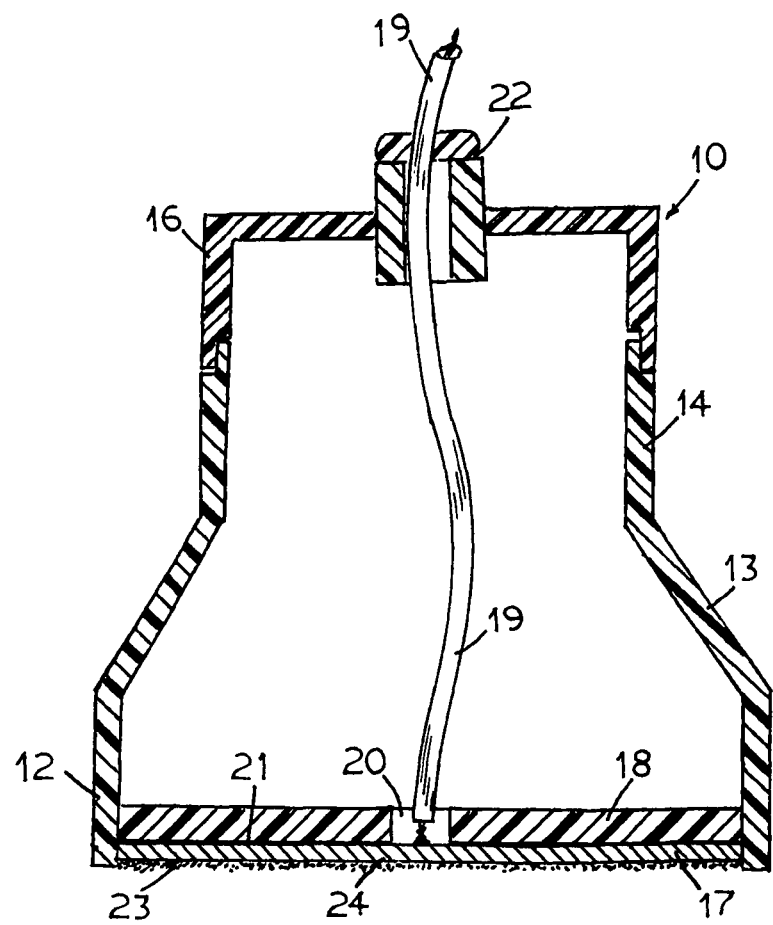
FIG. 3 is a sectional side view of the electrode according to the present invention.

With reference to the drawings, the geophysical electrode 10 according to the present invention has an inverted funnel-shaped main housing 11 having cylindrical shaped lower portion 12, an upwardly convergent dome-shaped middle portion 13 extending upwardly from the lower portion 12 to an upper cylindrical neck portion 14. The diameter of the lower portion 12 is larger than the upper neck portion 14. Typically, the overall height of the main housing 11 is about 10 cm, the diameter of the upper cylindrical neck portion is about 5 cm. The lower portion 12 has a bottom opening 15. A round cap 16 is mounted on the upper cylindrical neck portion 14 to cover the upper opening of the main housing 11. The main housing 11 and the round cap 16 may be made of a plastic material having an operating temperature range of −25° C. to 60° C. such the the electrode is suitable for operating in various extremely cold or hot weather conditions in geophysical prospecting sites.

It will be understood that although a cross sectional round shape housing is shown as an exemplary embodiment, it may also be of other shapes such as square, or multi-angular cross sectional shape to provide the same purposes.

A metal disk 17 made of a high electrically conductive metal such as copper is mounted in the lower portion 12 and located immediately adjacent to the lower opening 15. The metal disk 17 is maintained in place by a supporting disk 18 butting against the inner surface of the metal disk 17. The supporting disk 18 is preferably made of an electrically insulated material.

An electrical lead wire 19, extending from the top of the electrode 10 within the main housing 11 and through an opening 20 in the supporting disk 18, is connected to the upper surface 21 of the metal disk 17. The lead wire 19 is secured safely to the round cap 16 by a liquid-tight strain relief 22. The lead wire 19 is for connecting the electrode 10 to the electrical potential measuring instrument.

A layer 23 of an electrically conductive material is formed directly on the outer bottom surface 24 of the metal disk 17. The conductive material consists of a mixture of micron or nano size fine particles of flakes or powder of graphene, nanotube, or graphite, mixed with an adhesive material such as epoxy, inorganic binder, or RTV silicone. The mixture forms a dry layer 23 having a preferable thickness in the range of 0.3 mm to 1.0 mm adhered directly on the outer bottom surface 24 of the metal disk 17.

In use, the electrode 10 can be simply placed on the ground of the selected prospecting site with the layer 23 in contact with the ground which has been pre-wetted with water rather than the necessity of wetting the ground with environment polluting chemical electrolytic solution as in using the known electrodes. The inverted funnel-shaped housing 11 with the relatively larger lower portion 12 facilitates the electrode 10 to position securely on the ground. Any polarizing potential between the micron or nano size flakes of electrically conductive substance and the metal disk 17 would be discharged by ohmic contact among the flakes of electrically conductive substance as well as between the flakes of electrically conductive substance and the metal disk 17, and the metal disk 17 per se does not retain any polarizing potential.

The electrode 10 is maintenance free and has a rugged structure, safe to handle, easy to use, and no harmful substance is released into the ground in use since no health hazardous or toxic substance or compound is used in its construction.

What is claimed is:

1. A non-polarized geophysical electrode comprising:
    a plastic inverted funnel-shaped housing having a cylindrical lower portion and a cylindrical upper portion, said lower portion having a larger diameter than said upper portion, and said lower portion having a bottom opening,
    a round cap secured on top of said cylindrical upper portion,
    an electrically conductive metal disk mounted in said cylindrical lower portion of said housing, said metal disk having an outer bottom surface located immediately adjacent to and covering said bottom opening of said lower portion of said housing,
    a dry layer of a mixture of fine particles of flakes of an electrically conductive substance selected from the group of substance consisting of: granhene, nanotube, and graphite, mixed with an adhesive, formed on said outer bottom surface of said metal disk,
    an electrical lead wire connected to an inner surface of said metal disk and extending upward and outward from said cap, and said lead wire being secured to said round cap with a liquid-tight strain relief.

2. A non-polarized geophysical electrode according to claim 1 wherein said adhesive is chosen from the group of adhesive consisting of: epoxy, inorganic binder, and RTV silicone.

3. A non-polarized geophysical electrode according to claim 2 wherein said flakes of electrically conductive substance are in micron size.

4. A non-polarized geophysical electrode according to claim 2 wherein said flakes of electrically conductive substance are in nano size.

5. A non-polarized geophysical electrode according to claim 4 wherein said metal disk is made of copper.

6. A non-polarized geophysical electrode comprising:
    a plastic inverted funnel-shaped housing having a cylindrical lower portion and a cylindrical upper portion, said lower portion having a larger diameter than said upper portion, and said lower portion having a bottom opening;
    a convergent dome-shaped middle portion extending upwardly from said lower portion to said upper portion;
    a round cap secured on top of said upper portion;
    a supporting disk made of an electrically insulated material being mounted fixedly in said lower portion;
    an electrically conductive metal disk mounted in said lower portion and located immediately adjacent to and covering said bottom opening of said lower portion of said housing, said metal disk having an inner surface abutting against said supporting disk, and having a outer surface;
    a dry layer of a mixture of fine particles of flakes of graphene and epoxy formed on said outer surface of said metal disk;
    an electrical lead wire connected to said inner surface of said metal disk and extending upwards through an opening formed in said supporting disk to extend outward of said round cap, said lead wire being secured to said round cap with a liquid-tight strain relief.

7. A non-polarized geophysical electrode according to claim 6 wherein said particles of flakes of graphene are of nano size, and said metal disk is made of copper.

8. A non-polarized geophysical electrode according to claim 7 wherein said dry coating has a thickness in the range of 0.3 mm to 1.0 mm, and said housing is made of a plastic material having an operating temperature in the range of −25° C. to 60° C.

\* \* \* \* \*

UNITED STATES PATENT AND TRADEMARK OFFICE
CERTIFICATE OF CORRECTION

| | | |
|---|---|---|
| PATENT NO. | : 9,293,843 B2 | Page 1 of 1 |
| APPLICATION NO. | : 13/999781 | |
| DATED | : March 22, 2016 | |
| INVENTOR(S) | : Yi Lu | |

It is certified that error appears in the above-identified patent and that said Letters Patent is hereby corrected as shown below:

Title Page
In the Abstract, line 5: "nickel" should be deleted from the list of fine particles.

Claims
Column 4, line 46, in claim 8, "dry coating" should read "dry layer".

Signed and Sealed this
Fourteenth Day of June, 2016

Michelle K. Lee
*Director of the United States Patent and Trademark Office*